United States Patent
Estrada

(10) Patent No.: US 7,450,473 B1
(45) Date of Patent: Nov. 11, 2008

(54) VEHICLE RODENT REPELLING METHOD

(76) Inventor: Luis F. Estrada, 40463 Wagasa Pl., Temecula, CA (US) 92591

( * ) Notice: Subject to any disclaimer, the term of this patent is extended or adjusted under 35 U.S.C. 154(b) by 0 days.

(21) Appl. No.: 11/999,066

(22) Filed: Dec. 4, 2007

Related U.S. Application Data

(60) Provisional application No. 60/872,544, filed on Dec. 4, 2006.

(51) Int. Cl.
*H04B 1/02* (2006.01)

(52) U.S. Cl. .................................. 367/139; 340/384.2

(58) Field of Classification Search ................ 367/139; 340/384.2; 116/22 A
See application file for complete search history.

(56) References Cited

U.S. PATENT DOCUMENTS

| | | | |
|---|---|---|---|
| 4,178,578 A * | 12/1979 | Hall | 367/139 |
| 4,562,561 A | 12/1985 | Ackley | |
| 4,933,918 A * | 6/1990 | Landsrath et al. | 367/139 |
| 5,208,787 A | 5/1993 | Shirley | |
| 5,793,706 A | 8/1998 | Waletzky et al. | |
| 5,864,516 A * | 1/1999 | Brown et al. | 367/139 |
| 6,134,184 A | 10/2000 | Walstzky et al. | |
| 7,324,408 B2 * | 1/2008 | Cilliers | 367/139 |

* cited by examiner

*Primary Examiner*—Ian J Lobo

(57) ABSTRACT

An electronic rodent repelling device includes a housing electrically coupled to an existing power supply source of the vehicle, a power conditioning circuit for receiving an input voltage signal from the existing power supply source, and a signal generator electrically coupled directly to the power conditioning circuit. The device further includes an amplifier electrically coupled directly to the signal generator for receiving the output signal and thereafter transmitting an amplified signal, and an ultrasonic transducer electrically coupled directly to the amplifier for emitting an ultrasonic output signal based upon receipt of the amplified signal.

3 Claims, 1 Drawing Sheet

VEHICLE RODENT REPELLING METHOD

CROSS REFERENCE TO RELATED APPLICATIONS

This application claims the benefit of U.S. Provisional Application No. 60/872,544, filed Dec. 4, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to electronic rodent repellants and, more particularly, to an electronically operable vehicle rodent repelling device for protecting a vehicle from undesirable damage caused by rodents.

2. Prior Art

Many motorists experience problems with a car or truck that are caused by rodents. Animal and rodent problems are a common cause of car maladies. The most common problems are snakes and rodents nesting inside the car or under the hood, with rodents causing the most problems because of their exceptionally strong teeth and tendency to chew electrical wiring, accelerator cables, and battery casings. Rodents enjoy nesting on top of an engine, and their powerful jaws allow for the quick removal of any material that restricts the optimum nesting location. They are capable of eating wires and commonly gnaw and remove sections of heater hose in the process of making a nest. Having recognized the need for a device that prevents rodents from nesting in the engine compartment of a vehicle, the present invention was developed. Based on the above mentioned needs, it would be advantageous to provide a means for repelling rodents from an engine compartment of a vehicle.

U.S. Pat. No. 4,562,561 to Ackley discloses an apparatus for use as an ultrasonic pest repeller capable of having three different modes of operation for the purpose of generating ultrasonic signals for use in repelling all types of pests. The apparatus includes a circuit coupled at its output with one or more ultrasonic transducers and the circuit operates to generate electronic signals which are applied to the transducer or transducers for creating the ultrasonic signals in any one of three different modes of operation including a first mode in which a steady, modulated signal is generated, a second mode in which a dual pulse signal is generated with modulation of each pulse, and a third mode in which a signal is swept over a band of frequencies and is modulated simultaneously with the sweeping action. The circuit includes a rectifier for providing a DC regulated voltage. Moreover, the circuit includes components for generating a 60 Hz modulating voltage and a pair of timers which are coupled together and operated when a three-pole, three-position switch is selectively actuated, one of the timers being operable to generate a predetermined on-off voltage used to control the operation of the other timer, the output of the other timer supplying power to the transducer or transducers in the selected mode of operation of the circuit. Unfortunately, this prior art example is not designed for use with a preexisting vehicle.

U.S. Pat. No. 5,208,787 to Shirley discloses a sound wave generator for producing ultrasonic sound wave vibrations as well as low frequency vibrations which are offensive to rodents. A wiring conductor which serves as a sonic radiator is attached to an end portion of a solenoid rod which is reciprocated by a coil which is energized by alternating current power. The solenoid rod is permitted to vibrate within a hollow spool, and the sonic radiator is mechanically coupled to the solenoid rod by a high compliance, conductive metal spring. Ultrasonic sound waves are produced by forming the solenoid rod of a ferromagnetic material which is characterized by magnetostriction in the presence of an alternating magnetic field. The amplitude of sound wave vibration is intensified by selecting the length and diameter of the solenoid rod so that its natural frequency of vibration is in harmony with either the pulse frequency of the electromagnetic driving force, or alternatively, the frequency of ultrasonic sounds produced by magnetostriction. The sound wave generator circuit includes a pseudo-random signal generator for randomly gating the conduction of electrical alternating current through the solenoid coils during a pulsing duty cycle. Unfortunately, this prior art example is not designed for use with a preexisting vehicle.

U.S. Pat. No. 5,793,706 to Waletzky discloses an apparatus for repelling animals from an automobile that is mounted in an automobile having an engine compartment and an automotive battery. A generator for producing vibrations which can be sensed by animals is mounted in the engine compartment. The vibration generator is wired to the automotive battery for supplying electrical energy from the battery to the generator. A switch is connected to the vibration generator to switch the vibration generator between an activated state, in which the generator generates vibrations, and a deactivated state, in which the generator does not generate vibrations. The switch may be connected to the ignition of the automobile to deactivate the generator while the ignition is activated, and to activate the generator while the ignition is deactivated. Unfortunately, this prior art example is not operable when the vehicle is turned off; therefore, the vehicle is not protected at all times.

Accordingly, the present invention is disclosed in order to overcome the above noted shortcomings. The present invention is convenient and easy to use, lightweight yet durable in design, and designed for protecting a vehicle from undesirable damage caused by rodents. The electronic rodent repelling device is simple to use, inexpensive, and designed for many years of repeated use.

BRIEF SUMMARY OF THE INVENTION

In view of the foregoing background, it is therefore an object of the present invention to provide a device for protecting a vehicle from undesirable damage caused by rodents. These and other objects, features, and advantages of the invention are provided by an electronic rodent repelling device.

An electronic rodent repelling device includes a housing electrically coupled to an existing power supply source of the vehicle. Such a portable housing is effectively hardwired directly to the existing vehicle power supply source. The device further includes a power conditioning circuit for receiving an input voltage signal from the existing power supply source and thereafter generating a plurality of stepped down output voltage signals respectively.

The device further includes a signal generator electrically coupled directly to the power conditioning circuit. Such a signal generator conveniently transmits an oscillating output signal with approximately a 32 kilohertz wave length and includes a timer that is activated upon receiving the stepped down output voltage signal from the power conditioning circuit. Such a timer activates the signal generator after a predetermined amount of time from receipt of the stepped down output voltage signal to thereby create a delay between successive ones of the oscillating output signal. The oscillating output signal activates the amplifier which produces an amplified signal of greater frequency which is converted into an ultrasonic signal by the ultrasonic transducer.

The device further includes an amplifier electrically coupled directly to the signal generator for advantageously receiving the output signal and thereafter transmitting an amplified signal, and an ultrasonic transducer electrically coupled directly to the amplifier for emitting an ultrasonic output signal based upon receipt of the amplified signal. Such an ultrasonic transducer is a piezoelectric transducer.

At least one of the stepped down output voltage signals is transmitted directly to the amplifier while another one of the stepped down output voltage signals is transmitted directly to the signal generator respectively such that a frequency of the amplified signal is amplified over a range to achieved optimum operation of the ultrasonic transducer. The input voltage signal has a voltage level between 12-16 volts and the stepped down voltage signal has a voltage level of 9 volts.

A method for protecting a vehicle from undesirable damage caused by rodents includes the steps of: providing a housing electrically coupled to an existing power supply source of the vehicle; providing a power conditioning circuit; the power conditioning circuit receiving an input voltage signal from the existing power supply source and thereafter generating a plurality of stepped down output voltage signals respectively; providing a signal generator electrically coupled directly to the power conditioning circuit, the signal generator transmitting an oscillating output signal having approximately a 32 kilohertz wave length; providing an amplifier electrically coupled directly to the signal generator; the amplifier receiving the output signal and thereafter transmitting an amplified signal; providing an ultrasonic transducer electrically coupled directly to the amplifier; the ultrasonic transducer emitting an ultrasonic output signal based upon receipt of the amplified signal; and transmitting at least one of the stepped down output voltage signals directly to the amplifier while transmitting another one of the stepped down output voltage signals directly to the signal generator respectively such that a frequency of the amplified signal is amplified over a range to achieved optimum operation of the ultrasonic transducer.

The method further includes the steps of: providing a timer; activating the timer upon receiving the stepped down output voltage signal from the power conditioning circuit; and the timer activating the signal generator after a predetermined amount of time has elapsed from receipt of the stepped down output voltage signal to thereby create a delay between successive ones of the oscillating output signal.

The method further includes the steps of: the oscillating output signal activating the amplifier; the amplifier producing an amplified signal of greater frequency; and the ultrasonic transducer converting the amplified signal into an ultrasonic signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
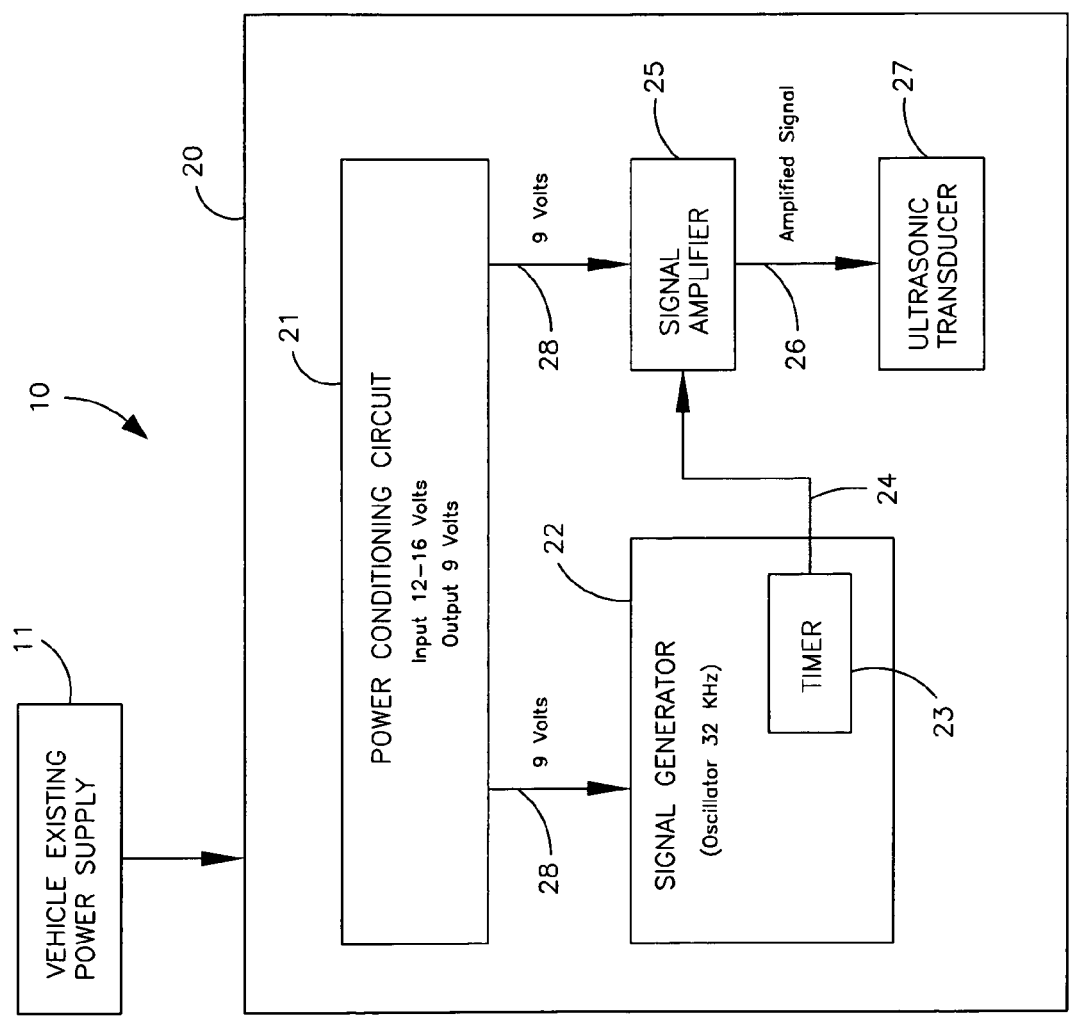
FIG. 1 is a schematic block diagram of an electronic rodent repelling device, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIG. 1 by the reference numeral 10 and is intended to protect an electronic rodent repelling device. It should be understood that the device 10 may be used to protect many different types of vehicles and should not be limited in use with only those types of vehicles mentioned herein.

Referring initially to FIG. 1, an electronic rodent repelling device 10 includes a housing 20 electrically coupled to an existing power supply source 11 of the vehicle. Such a portable housing 20 is hardwired directly, without the use of intervening elements, to the existing vehicle power supply source 11. The device 10 further includes a power conditioning circuit 21 for receiving an input voltage signal from the existing power supply source 11 and thereafter generating a plurality of stepped down output voltage signals respectively. The housing 20 is conveniently designed to be discreetly stored in the engine compartment of a preexisting vehicle.

Referring again to FIG. 1, the device 10 further includes a signal generator 22 electrically coupled directly, without the use of intervening elements, to the power conditioning circuit 21. Such a signal generator 22 transmits an oscillating output signal with approximately a 32 kilohertz wave length and includes a timer 23 that is activated upon receiving the stepped down output voltage signal from the power conditioning circuit 21. Such a timer 23 activates the signal generator 22 after a predetermined amount of time from receipt of the stepped down output voltage signal to thereby create a delay between successive ones of the oscillating output signal 24.

Referring again to FIG. 1, the device 10 further includes an amplifier 25 electrically coupled directly, without the use of intervening elements, to the signal generator 22 for receiving the output signal 24 and thereafter transmitting an amplified signal 26, and an ultrasonic transducer 27 electrically coupled directly, without the use of intervening elements, to the amplifier 25 for emitting an ultrasonic output signal based upon receipt of the amplified signal 26. Such an ultrasonic transducer 27 is a piezoelectric transducer. The oscillating output signal 24 activates the amplifier 25 which produces an amplified signal 26 of greater frequency which is converted into an ultrasonic signal by the ultrasonic transducer 27.

At least one of the stepped down output voltage signals 28 is transmitted directly to the amplifier 25 while another one of the stepped down output voltage signals 28 is transmitted directly, without the use of intervening elements, to the signal generator 22 respectively which is important such that a frequency of the amplified signal 26 is amplified over a range to achieved optimum operation of the ultrasonic transducer 27. The input voltage signal has a voltage level between 12-16 volts and the stepped down voltage signal has a voltage level of 9 volts.

The device includes overall dimensions of four inches in length, 2 inches in width, and 2 inches in depth, as an example. Of course, such a device can be produced in a variety of sizes, as is obvious to a person of ordinary skill in the art. Such a device includes a signal generator that operates on DC power, and is connected to vehicular power via insulated wiring. The device further includes a voltage regulator, a sound amplifier and an audio transducer. The device continuously emits a high frequency signal, advantageously undetectable by a human ear, which is amplified and emitted from the transducer. Such a signal repels rodents and prevents them from causing damage, which is essential to reducing maintenance and repair costs for the owner of the vehicle.

The present invention, as claimed, provides the unexpected and unpredictable benefit of a device that is convenient and easy to use, is lightweight yet durable in design, and repels rodents from an engine compartment of a vehicle. Such a device effectively repels rodents and advantageously prevents them from causing damage to components within the engine compartment. The device is simple to install and is inexpensive. The present invention can be utilized by private users as well as commercial storage and sales lots.

In use, a method for protecting a vehicle from undesirable damage caused by rodents includes the steps of: providing a housing 20 electrically coupled to an existing power supply source 11 of the vehicle; providing a power conditioning circuit 21; the power conditioning circuit 21 receiving an input voltage signal from the existing power supply source 11 and thereafter generating a plurality of stepped down output voltage signals 28 respectively; providing a signal generator 22 electrically coupled directly, without the use of intervening elements, to the power conditioning circuit 21, the signal generator 22 transmitting an oscillating output signal 24 having approximately a 32 kilohertz wave length; providing an amplifier 25 electrically coupled directly, without the use of intervening elements, to the signal generator 22; the amplifier 25 receiving the output signal 24 and thereafter transmitting an amplified signal 26; providing an ultrasonic transducer 27 electrically coupled directly, without the use of intervening elements, to the amplifier 25; the ultrasonic transducer 27 emitting an ultrasonic output signal based upon receipt of the amplified signal 26; and transmitting at least one of the stepped down output voltage signals 28 directly, without the use of intervening elements, to the amplifier 25 while transmitting another one of the stepped down output voltage signals 28 directly, without the use of intervening elements, to the signal generator 22 respectively such that a frequency of the amplified signal 26 is amplified over a range to achieved optimum operation of the ultrasonic transducer 27.

In use, the method further includes the steps of: providing a timer 23; activating the timer 23 upon receiving the stepped down output voltage signal 28 from the power conditioning circuit 21; and the timer 23 activating the signal generator 22 after a predetermined amount of time has elapsed from receipt of the stepped down output voltage signal 28 to thereby create a delay between successive ones of the oscillating output signal.

In use, the method further includes the steps of: the oscillating output signal 24 activating the amplifier 25; the amplifier 25 producing an amplified signal 26 of greater frequency; and the ultrasonic transducer 27 converting the amplified signal 26 into an ultrasonic signal. By amplifying the frequency over a range, optimum operation of the ultrasonic transducer 27 is obtained. Furthermore, amplifying the frequency of the ultrasonic signal is more stressful to the rodent and reduces the likelihood of the rodent's ability to tolerate the ultrasonic signal.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A method for protecting a vehicle from undesirable damage caused by rodents, said method comprising the steps of:
    a. providing a housing electrically coupled to an existing power supply source of the vehicle;
    b. providing a power conditioning circuit;
    c. said power conditioning circuit receiving an input voltage signal from the existing power supply source and thereafter generating a plurality of stepped down output voltage signals respectively;
    d. providing a signal generator electrically coupled directly to said power conditioning circuit;
    e. said signal generator transmitting an oscillating output signal having approximately a 32 kilohertz wave length;
    f. providing an amplifier electrically coupled directly to said signal generator;
    g. said amplifier receiving said output signal and thereafter transmitting an amplified signal;
    h. providing an ultrasonic transducer electrically coupled directly to said amplifier;
    i. said ultrasonic transducer emitting an ultrasonic output signal based upon receipt of said amplified signal; and
    j. transmitting at least one of said stepped down output voltage signals directly to said amplifier while transmitting another one of said stepped down output voltage signals directly to said signal generator respectively such that a frequency of said amplified signal is amplified over a range to achieved optimum operation of said ultrasonic transducer.

2. The method of claim 1, wherein step d. comprises the steps of:
    providing a timer;

activating said timer upon receiving said stepped down output voltage signal from said power conditioning circuit; and said timer activating said signal generator after a predetermined amount of time has elapsed from receipt of said stepped down output voltage signal to thereby create a delay between successive ones of said oscillating output signal.

3. The method of claim 2, further comprising the steps of:

said oscillating output signal activating said amplifier;

said amplifier producing an amplified signal of greater frequency; and said ultrasonic transducer converting said amplified signal into an ultrasonic signal.

\* \* \* \* \*